United States Patent
Eisele et al.

(10) Patent No.: US 6,678,599 B2
(45) Date of Patent: Jan. 13, 2004

(54) DEVICE FOR IMPACT DETECTION IN A VEHICLE

(75) Inventors: Sybille Eisele, Hildesheim (DE); Michael Roelleke, Leonberg-Hoefingen (DE); Marc Theisen, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/219,720

(22) Filed: Aug. 15, 2002

(65) Prior Publication Data

US 2003/0051530 A1 Mar. 20, 2003

(51) Int. Cl.[7] ................................................ B60R 22/00
(52) U.S. Cl. .......................................... 701/45; 280/735
(58) Field of Search ................................ 701/45, 46, 47; 180/268, 272, 282; 280/735, 734, 730.1, 728.2, 738; 342/72; 340/669

(56) References Cited

U.S. PATENT DOCUMENTS 6,529,810 B2 * 3/2003 Foo et al. ...................... 701/45
6,533,316 B2 * 3/2003 Breed et al. ................... 701/45
6,609,053 B1 * 8/2003 Breed ........................... 701/45

FOREIGN PATENT DOCUMENTS

| DE | 197 39 655 | 11/1998 |
| DE | 197 36 840 | 2/1999 |
| DE | 198 17 334 | 8/1999 |
| DE | 199 17 710 | 10/2000 |
| DE | 100 12 434 | 5/2001 |
| DE | 199 57 187 | 5/2001 |
| WO | WO 98/15435 | 4/1998 |

* cited by examiner

*Primary Examiner*—Richard M. Camby
(74) *Attorney, Agent, or Firm*—Kenyon & Kenyon

(57) ABSTRACT

A device for impact detection in a motor vehicle has both a precrash sensor and an impact sensor, and when an impact is detected, the noise threshold for the impact sensor is lowered, so that the deployment time can then be determined as a function of the signals of the precrash sensor and the impact sensor. Various features are extracted from the signals of the impact sensor and then compared with continuous threshold functions to detect a deployment case. The deceleration and/or velocity and/or predisplacement may be used as features.

5 Claims, 2 Drawing Sheets

DEVICE FOR IMPACT DETECTION IN A VEHICLE

FIELD OF THE INVENTION

The present invention relates to a device for impact detection in a vehicle.

BACKGROUND INFORMATION

PCT Publication No. WO 98/15435 describes a device having both a precrash sensor and an impact sensor. With the precrash sensor, it is possible to determine the point in time of the impact and the impact velocity.

German Published Patent Application No. 199 57 187 describes a device having precrash sensors and impact sensors, the time of impact being determined with the help of precrash sensors. German Patent No. 198 17 334 describes a device having precrash sensors and impact sensors, the deployment threshold being lowered as a function of the presence of a precrash sensor signal and an impact sensor signal. It is known from German Published Patent Application No. 100 12 434 that an impact sensor may be designed as an acceleration sensor, a deformation sensor, a pressure sensor, or a structure-borne noise sensor. It is known from German Published Patent Application No. 197 39 655 that the precrash sensor may be designed as a radar sensor, a video sensor, or a noise sensor. It is known from German Published Patent Application No. 197 36 840 that the processor determines the deployment of restraint devices as a function of impact velocity and time of impact from the second signals. It is known from German Published Patent Application No. 199 17 710 that a threshold function is formed from a crash test.

SUMMARY OF THE INVENTION

The device according to the present invention for impact detection in a vehicle has the advantage over the related art that the noise threshold for the impact sensor is lowered as a function of the signals of the precrash sensor. The algorithm for calculating the deployment time for the restraint devices may thus begin at an earlier point in time. This is possible because when a time of impact is determined, it is certain that an object will crash with the vehicle. In addition, by combining the signals of the precrash sensor and the impact sensor, it is possible to determine the severity of the crash. The impact velocity and the type of crash indicate the severity of the crash. The type of crash may be extracted from the acceleration signals, this extraction being performed over velocity-dependent features. This increases the certainty, because the restraint devices may thus be used with greater precision and greater ability to adapt to the impact. The crash may thus be better identified as such. On the whole, the device according to the present invention thus results in a more accurate determination of the deployment time.

It is especially advantageous that the impact sensor is designed either as an acceleration sensor, a deformation sensor, a pressure sensor, a temperature sensor, or a structure-borne noise sensor. Combinations of these sensors may also be used, in particular in systems for plausibility checking. A precrash sensor used for side impact sensing may be combined with a structure-borne noise sensor, for example, or an acceleration sensor as a plausibility sensor. The precrash sensor may be designed as a radar sensor, a video sensor or a sound sensor, preferably an ultrasonic sensor. Here again, it is possible to use a combination of these sensors, i.e., for example, a radar sensor combined with a video sensor, in order to utilize the different distances covered by these sensors.

In addition, it is advantageous that the processor derives features from the signals of the impact sensor, i.e., the second signals, and these features are then investigated and compared with a threshold value function as a function of the signals of the precrash sensor in particular in order to determine the deployment time from these features. This provides in a particularly robust manner how the deployment time may be determined accurately in order to thus provide greater safety for the passengers of the vehicle in the event of an impact. Possible features for use here include in particular the deceleration, the velocity or the predisplacement. Thus, if an acceleration sensor is used, features may be derived from these acceleration signals through single and double integration. The threshold value function is used here as a function of velocity to compare it with the features and thus determine whether or not the threshold has been exceeded. If the threshold is exceeded, a deployment is signaled. The threshold value function may be either continuous or discrete.

The threshold value function is determined on the basis of crash tests by discovering the relationship between the impact velocity and the required airbag deployment time. This relationship may be generalized through the knowledge of an expert to types of crashes for which there have not been sufficient tests, so that this relationship may be extracted. A set of curves is based on a ranking with respect to crash severity. Thus a certain crash severity may be allocated to each type of crash. On this basis, features may be extracted either for crashes at the same velocity or the same crash severity or with the same type of crash. These features may be generalized to the other velocities or crash severities.

In this case, the knowledge extracted from the data of a subset of crash signals is transferred to other subsets. Thus, a functional relationship found in the data on one type of crash may be transferred to another type, either automatically or through the knowledge of an expert. The same thing is also possible in a transition from one velocity to another. This is particularly advantageous if only at least one crash test or even no crash tests have been conducted for some types of crashes. Therefore, the airbag may be deployed precisely at the required point in time even in these real world cases.

A crash class is identified for each type of crash for extraction of the features. The method described here makes is possible to combine crash classes whose deployment times are similar into one deployment class. In this way, crashes having different signal curves may be mapped onto the same deployment time. This permits the most accurate possible identification of crash classes while also the data and/or computation complexity for the deployment times remains low.

DETAILED DESCRIPTION

Figure 1:
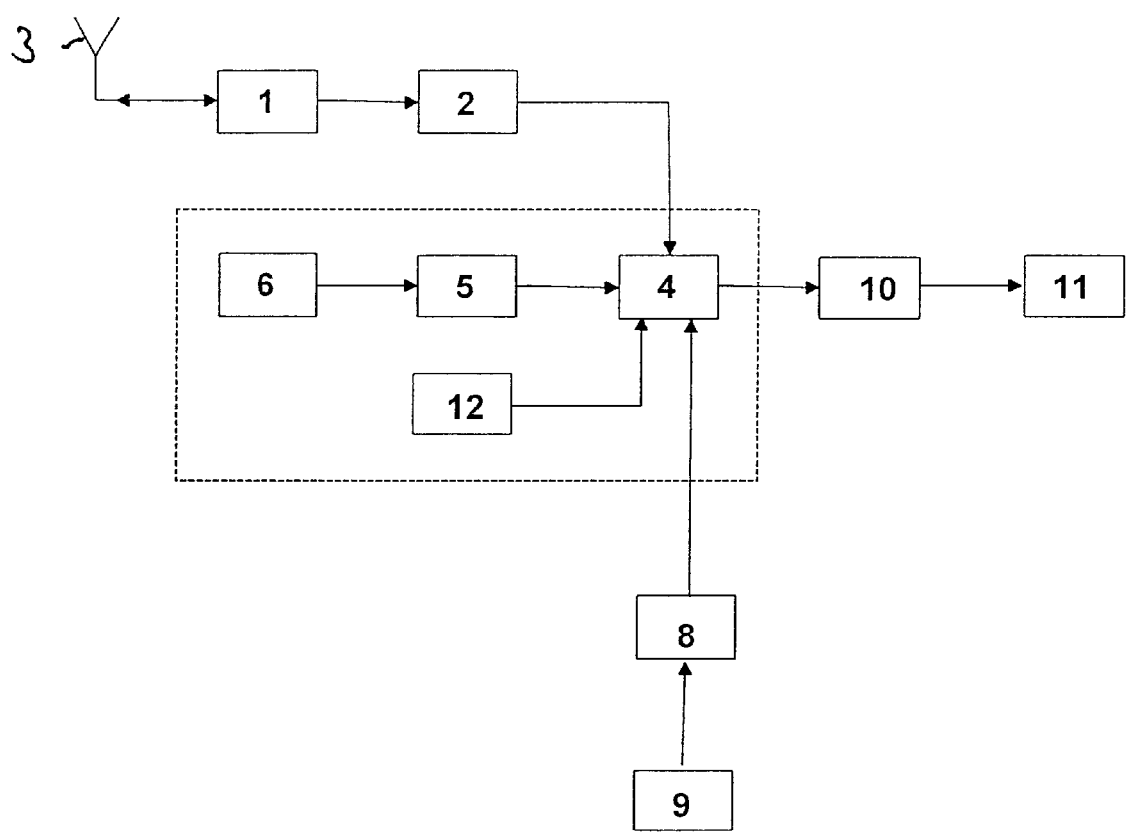
FIG. 1 shows a block diagram of the device according to the present invention.

In the future, airbag deployment units will be required to calculate the deployment time with such a high accuracy that a multistage deployment decision is made possible. This means that in the case of a very mild impact, the seat-belt tightening devices are deployed first and then in a more severe impact the airbag is deployed in the first stage, and in a very severe impact the airbag is deployed in both stages. Of course even more stages are also possible. This is possible only to a limited extent in the case of devices which analyze only acceleration signals. Therefore, with the device according to the present invention, in addition to the acceleration signals, the impact velocity supplied by one or more radar sensors or other sensors for all-around viewing and the time of impact may also be taken into account in calculating airbag deployment. Since both parameters are determined before impact, this device is referred to as a precrash device and the algorithm calculating the deployment is referred to as a precrash algorithm.

By knowing the time of impact, the algorithm may begin to analyze the acceleration signals at the moment of impact and does not have to wait until the signals exceed a certain noise threshold. With regard to impact velocity, as has been found in a study by the National Highway Traffic Safety Administration in the United States, knowledge of the impact velocity is beneficial to increasing the protection of passengers in more than 80% of the crashes of passenger vehicles and light trucks. To reduce the risk of excessive airbag deployment at low impact velocities, a precise differentiation of velocity is required by American law (Federal Motor Vehicle Safety Standards and Regulations—FMVSS 208). The goal of the device according to the present invention is to fulfill the above-mentioned possibilities and requirements.

The idea of the algorithm for calculating deployment time is that an analysis is performed for the given velocity at the first point in time in order to determine whether the present crash belongs to a first crash class or to the other crash classes. At the second point in time, the analysis determines whether the crash belongs to the second crash class or to the others. The algorithm runs through all the classes in this way. The algorithm is thus capable of observing the signal for the longest possible period of time before making a decision.

To make this possible, threshold values for velocity-dependent features such as acceleration, velocity and predisplacement are defined. If a threshold is exceeded, the feature is satisfied. Deployment cases or nondeployment cases generated in this way do not, however, mean that the airbag must be deployed for the crash in question. This also depends on other parameters such as passenger occupancy. It should also be recalled that there are soft crashes and hard crashes, which result in deployment of the restraint devices at different points in time.

These threshold values will now be considered as a function of velocity. Since only individual points are covered by crash tests, and since it would be desirable to have a threshold value function to cover the crash cases occurring in between in the real world, a linear interpolation or extrapolation is performed, or in the case of a parameterizable function, the parameters are adjusted so that the deployment and nondeployment functions are separated as sharply as possible. The goal of both implementation approaches is to provide a continuous threshold value function which separates deployment cases from nondeployment cases. In comparison with the discrete threshold value function, the continuous threshold value function offers the advantage that the airbag may be deployed more accurately.

Additional parameters which also play a role here include the fact that the individual airbags may be controlled differently, which depends on the direction of impact, for example, as well as on passenger occupancy.

FIG. 1 shows in a block diagram the device according to the present invention. An antenna 3 of a precrash sensor is connected to a transceiver station 1, which also generates signals, i.e., it has an oscillator to generate radar signals. It is thus a microwave transceiver station, so that antenna 3, which functions as a transmitting and receiving antenna, together with transceiver station 1 forms a radar sensor. For the sake of simplicity, only one radar sensor is shown here. However, a vehicle may have more than one radar sensor, e.g., two, three or four.

As an alternative to the radar sensor, a video sensor, or an ultrasonic sensor may also be used. Combinations of these sensors may also be used here. These combinations are not presented here for the sake of simplicity.

A signal processor 2 which analyzes the received signals of transceiver station 1, optionally including the transmission signals, and thus determines the velocity and/or distance of the object detected, is connected downstream from transceiver station 1. The time of impact is determined from the velocity and distance. This data is then transmitted from signal processor 2 to a processor 4, namely its first data input. This line may be either a two-wire line, an optical line, or a bus. Signal processor 2 or its functions may be assigned to transceiver station 1 and processor 4.

Processor 4 is arranged in a control device 7. Here control device 7 has its own additional acceleration sensor 6. This acceleration sensor 6 is connected to a signal processor 5 which is connected to a second data input of processor 4. Signal processor 5 digitizes the values of acceleration sensor 6. In addition, amplification of measured values is also performed. Control device 7 is usually placed on the vehicle axle hump. However, it may also be placed in other locations in a vehicle. In addition, a peripherally mounted impact sensor 9, here also an acceleration sensor, is connected to processor 4, namely to a third input of processor 4 via a signal processor 8. The peripherally mounted acceleration sensors are used here as upfront sensors and/or as side impact sensors. To do so, the upfront sensors are placed on the radiator, for example, and the side impact sensors are placed either in the B-C column or on the seat cross member. Only one peripherally mounted acceleration sensor is shown here as an example, but it is also possible to have no sensor or two sensors in a vehicle, either two upfront sensors, two side impact sensors or combinations thereof. In addition to acceleration sensors, it is also possible to use pressure sensors, temperature sensors, and deformation sensors as peripherally mounted impact sensors. For the device according to the present invention, it is possible to omit peripheral sensors because the sensors in control device 7 are also adequate for correct functioning.

Airbag control device 7 with its processor 4 is connected to a restraint device control 10 which in turn activates restraint devices 11. Either airbags and/or seat-belt tightening devices are provided as restraint devices 11 in a vehicle. Here again, only one restraint device 11 is shown as an example. Restraint device control 10 may control more than one restraint device. The connection between airbag control device 7 and the restraint devices may be established over a bus, but a two-wire line is used here. As an alternative, an optical fiber may also be used. Triggering of restraint devices may also be accomplished by way of a magnetic coupling or by wireless transmission. This is appropriate in moving parts such as the seats.

Processor 4 is also connected to a memory 12 by way of a data input/output. At least one threshold value function is loaded out of memory 12, and memory 12 also functions for intermediate storage.

Figure 2:
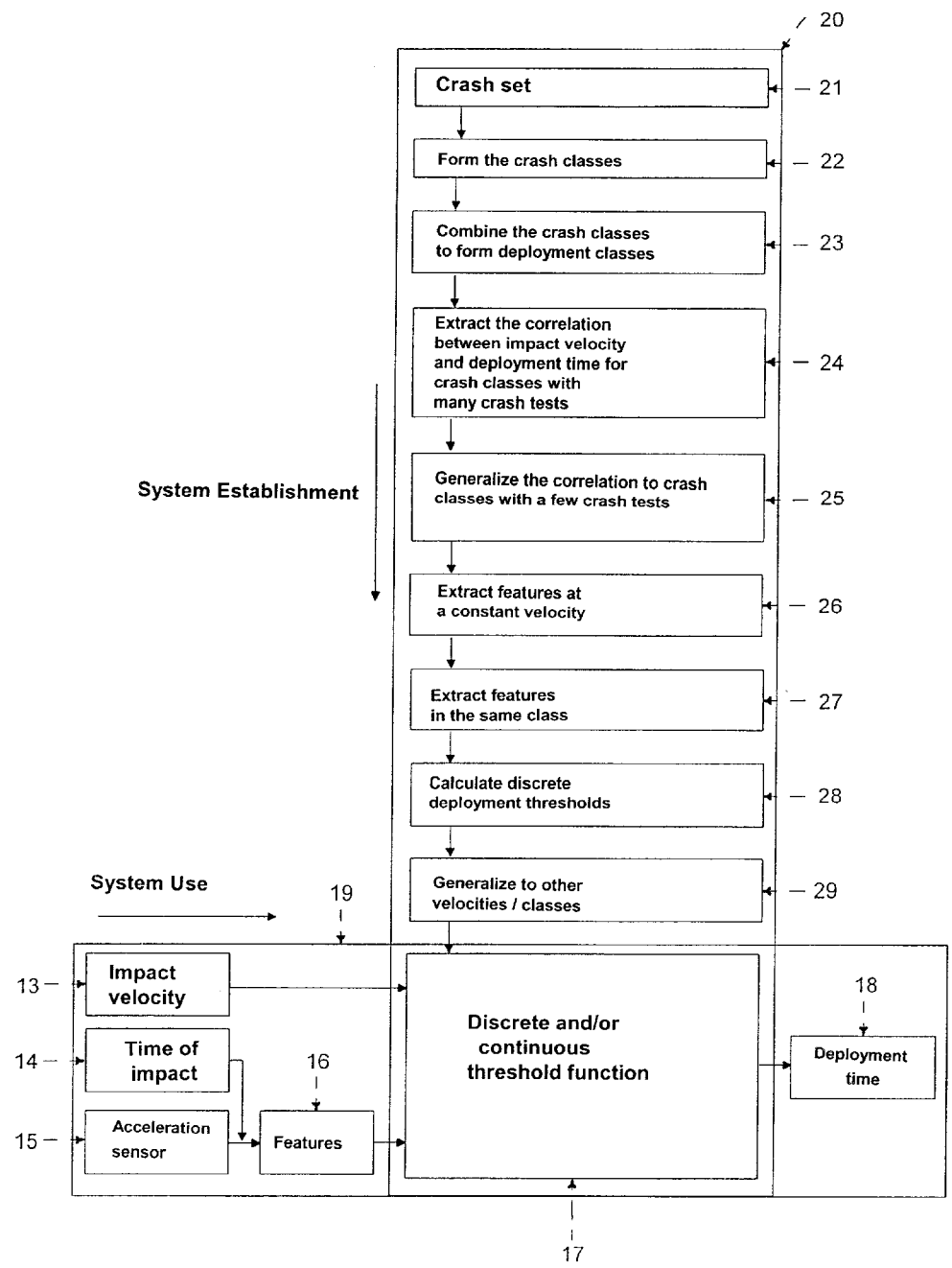
FIG. 2 shows a flow chart of the method taking place in the device according to the present invention.

FIG. 2 shows a flow chart for the method taking place in the device according to the present invention. Method steps 13 through 18 belong to use of the system (block 19) and are implemented in the vehicle using the device according to the present invention. Method steps 21 through 29 belong to block 20, for establishment of the system. They generate the threshold value function and are implemented by the manufacturer.

The impact velocity and time of impact are determined first with precrash sensor 1, 3 in method steps 13 and 14. The acceleration signal is determined in method step 15 with peripherally mounted impact sensor 9 and centrally located impact sensor 6. After the impact (block 14), the features are calculated by processor 4 from the acceleration signal in method step 16. For this calculation, the acceleration signal is used here, the velocity signal via the first integral and the predisplacement signal via the second integral.

Processor 4 performs the comparison of calculated feature values with the respective threshold value functions in method step 17, i.e., there is a separate threshold value function for each feature or each combination of features used. If the features exceed the respective threshold value function, a deployment case is recognized. The fundamentally velocity-dependent threshold value function is considered for the impact velocity measured with the precrash system. Thus, if the velocity has been defined, the deployment time is calculated merely from the value of this feature. This calculation is performed in method step 18.

To be able to use the system as illustrated under method step 19, the threshold value function is established as explained under establishment of the system in method step 20. Crash classes are created in method step 22 on the basis of the set of crash tests given in method step 21. In method step 23 it is possible to combine a plurality of crash classes having similar deployment times to form deployment classes.

In method step 24, the relationship between velocity and deployment time is defined for the individual deployment classes. This is done by extracting the relationship from the data for the classes for which there are many crash tests. This extracted functional relationship may be of any desired type, e.g., a parameterizable linear function, or a piece-by-piece linear function may describe the relationship well. The function determined for the respective class is referred to as a deployment function. Since it may be assumed that the vehicle behaves similarly with the other classes, this recognized relationship may be transferred to the other classes through continuously variable parameters (method step 25).

Since the impact velocity may be measured by the precrash sensor, features which may change with the impact velocity may be extracted from the data in the two following method steps (26, 27). These features are based on the acceleration signal, the first integral of the acceleration signal, i.e., the velocity signal, or based on the second integral, i.e., the predisplacement signal. The features may either be directly values of these signals, i.e., the predisplacement at a certain point in time, for example, or they may be values or properties derived from the signals, e.g., the number of signal peaks in a certain period of time, or that the signal remains below a threshold for a certain period of time. It is also possible to use combinations of features. For example, such a combined feature is used for a truck underride crash, because the two-fold integration of the acceleration, i.e., the predisplacement, is not adequate to detect this case. In other words, the vehicle strikes the truck with the engine instead of with its load-bearing structures. Therefore, deceleration of the vehicle occurs at a much later point in time, but then is very sharp. Therefore, the value of the second integral to the required deployment time is lower in comparison with a harder crash at the same velocity. Additional features are therefore be extracted from the acceleration signal. One possible way of detecting this type of crash is to consider the velocity signal to determine if it shows a very low decline in velocity in the initial phase. In addition, in a second phase, the acceleration signal has a definite peak and the velocity signal shows a marked decline in velocity. If this combination of three features is met, it is then assumed that the crash analyzed is a truck underride.

Such features are extracted in two steps, namely method steps 26 and 27. In the first step, the impact velocity is kept constant to detect the dependence of the feature on the crash class or deployment class. Only the velocities for which there are numerous crash tests are considered here (step 26). Likewise, in method step 27, all crash classes and deployment classes for which a sufficient number of crash tests are available are investigated. In each case a fixed class is considered, and the dependence of the feature on the velocity is extracted for this class.

Keeping the velocity constant means that crashes having a similar velocity are considered together. Therefore, velocity bands are formed and investigated. The average velocity of the band is assigned to all crashes of one band. A discrete grid is obtained from the values of the individual deployment functions at the average velocity. Then the values of the features are plotted as a function of grid points having the same velocity (method step 26) or as a function of grid points belonging to the same class (method step 27) and investigated. As explained above, the idea for calculating deployment time is to perform an analysis of the velocity measured by the precrash sensor at the individual points in time to determine whether the crash belongs to the class for which the airbag should be deployed at the point in time in question or whether the crash belongs to a class for which the airbag is to be deployed at a later time (method step 18). To make this method possible, threshold values for the individual features are placed over the grid described here. If a threshold is exceeded, then the feature is satisfied and the airbag is deployed. To do so, the values of the feature for deployment cases and nondeployment cases are plotted over the grid. Deployment case or nondeployment case in this stage of decision-making regarding airbag deployment is not a question of whether or not deployment is necessary for the crash in question in general, but instead it is assumed in this case that fundamentally the airbag is to be deployed for the given crash case. As described above, the decision regarding airbag deployment in later stages may depend on additional parameters such as passenger occupancy. In the stage in question here, however, the terminology should indicate whether or not the airbag is to be deployed for a crash of the present class at the measured velocity at the point in time in question. If it is not deployed, this means that it will be deployed at a later point in time.

The goal is now to find a function which will separate deployment cases from nondeployment cases. To do so, in method step 28 a calculation of discrete deployment thresholds is performed. Discrete thresholds are obtained by attempting to find the threshold value such that the feature values of the deployment cases are separated as much as possible from those of the nondeployment cases. If no feature values are available from crash tests for a grid point, the threshold value for this grid point is calculated from the surrounding points by interpolation or extrapolation (method step 29). At this point, an expert may intervene and manipulate the method to complete, correct or optimize the thresholds. It is optionally now possible to go from this discrete threshold value function to a continuous function, because the continuous threshold value function offers the advantage that it allows the airbag to be deployed more precisely. Two possible approaches for implementation involve either attempting to interpolate or extrapolate these discrete thresholds or attempting to adjust the parameters in the case of a parameterizable function, so that the function separates deployment cases from nondeployment cases as sharply as possible. This discrete or continuous threshold value function is used to calculate the deployment time during use of the system (method step 19) in method step 17 in the airbag control device.

What is claimed is:

1. A device for performing an impact detection in a vehicle, comprising:

a processor;

at least one impact sensor;

a memory; and at least one precrash sensor that is connectable to the at least one impact sensor, the processor determining a time of impact as a function of first signals of the at least one precrash sensor, wherein:

the processor lowers a noise threshold for the at least one impact sensor, the processor then determines a deployment time for a restraint device connected to the device as a function of the first signals and second signals of the at least one impact sensor, the processor loads a continuous threshold value function from the memory for a set of features derived by the processor from the second signals, and the processor compares the set of features with the continuous threshold value function as a function of the first signals to determine the deployment time.

2. The device as recited in claim 1, wherein:

the at least one impact sensor includes one of an acceleration sensor, a deformation sensor, a pressure sensor, a temperature sensor, and a structure-borne noise sensor.

3. The device as recited in claim 1, wherein:

the at least one precrash sensor includes one of a radar sensor, a video sensor, and a sound sensor.

4. The device as recited in claim 1, wherein:

the processor determines a deployment of the restraint device from the second signals as a function of an impact velocity and a time of impact.

5. The device as recited in claim 1, wherein:

the continuous threshold value function is formed from crash tests by combining the crash tests into at least one of classes and velocity bands and extracting features from at least two of the classes and from at least two of the velocity bands.

* * * * *